(12) United States Patent
Kossira et al.

(10) Patent No.: US 8,768,535 B2
(45) Date of Patent: Jul. 1, 2014

(54) METHOD AND APPARATUS FOR THE RECOGNITION OF A TRAILER OF A MOTOR VEHICLE

(75) Inventors: Christoph Kossira, Ingolstadt (DE); Andreas Baudisch, Alteglofsheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/992,629

(22) PCT Filed: Dec. 5, 2011

(86) PCT No.: PCT/EP2011/006073
§ 371 (c)(1),
(2), (4) Date: Jun. 7, 2013

(87) PCT Pub. No.: WO2012/076138
PCT Pub. Date: Jun. 14, 2012

(65) Prior Publication Data
US 2013/0261843 A1 Oct. 3, 2013

(30) Foreign Application Priority Data
Dec. 8, 2010 (DE) .......................... 10 2010 053 818

(51) Int. Cl.
*G06F 7/00* (2006.01)
*B60D 1/36* (2006.01)
*B60D 1/46* (2006.01)
*B60D 1/58* (2006.01)
*G08G 1/00* (2006.01)
*F16H 48/20* (2012.01)
*B60T 7/20* (2006.01)

(52) U.S. Cl.
CPC . *B60D 1/36* (2013.01); *B60D 1/465* (2013.01); *B60D 1/58* (2013.01); *G08G 1/22* (2013.01); *F16H 2048/204* (2013.01); *B60T 7/20* (2013.01)
USPC .............. 701/1; 701/69; 340/693.6; 348/148; 180/14.2

(58) Field of Classification Search
CPC ............ B60D 1/36; B60D 1/465; B60E 1/58; G08G 1/22; F16H 2048/204; B60T 7/20
USPC .............. 701/1, 69; 280/39, 40, 47.19, 149.2, 280/403, 407.1, 408, 415.1, 418.1, 446.1, 280/455.1, 474, 476.1, 477, 491.1, 491.2, 280/491.3, 492, 495, 504, 508, 510, 511, 280/656, 769, 789; 340/693.6; 348/148; 104/20; 180/14.2
See application file for complete search history.

(56) References Cited

U.S. PATENT DOCUMENTS 5,287,085 A 2/1994 Smith
7,852,211 B2 * 12/2010 Gunn et al. .................. 340/541
(Continued)

FOREIGN PATENT DOCUMENTS

DE 91 04 500.2 9/1992
DE 100 23 326 11/2001
(Continued)

OTHER PUBLICATIONS

International Search Report issued by the European Patent Office in International Application PCT/EP2011/006073 on Mar. 28, 2012.

*Primary Examiner* — McDieunel Marc
(74) *Attorney, Agent, or Firm* — Henry M. Feiereisen LLC

(57) ABSTRACT

A method and device for the recognition of a trailer (2) of a motor vehicle (1), wherein the trailer (2) is connected to the motor vehicle (1) via a coupling device (3), wherein a control device (4) collects and stores data relating to the currently connected trailer (2) during an operating phase of the motor vehicle, and a device for identification (5) of the trailer (2) is able to ascertain, by means of a test signal, a separation of the connected trailer (2) from the motor vehicle (1) during the shutdown phase of the motor vehicle (1).

11 Claims, 1 Drawing Sheet

(56) References Cited

U.S. PATENT DOCUMENTS

| | | |
|---|---|---|
| 8,322,729 B2 | 12/2012 | Michel et al. |
| 8,371,593 B2 | 2/2013 | Michel et al. |
| 8,500,133 B2 | 8/2013 | Michel et al. |
| 2001/0040455 A1 | 11/2001 | Arlt et al. |
| 2007/0260385 A1 | 11/2007 | Tandy, Jr. et al. |
| 2007/0285270 A1* | 12/2007 | Gunn et al. ............ 340/693.6 |
| 2008/0180526 A1* | 7/2008 | Trevino ................ 348/148 |
| 2010/0109857 A1* | 5/2010 | Bennie et al. ............ 340/447 |
| 2010/0156667 A1 | 6/2010 | Bennie et al. |
| 2010/0332051 A1* | 12/2010 | Kormann .................... 701/2 |
| 2011/0001825 A1* | 1/2011 | Hahn ..................... 348/148 |
| 2011/0216199 A1* | 9/2011 | Trevino et al. .......... 348/148 |
| 2011/0257860 A1 | 10/2011 | Getman et al. |

FOREIGN PATENT DOCUMENTS

| | | |
|---|---|---|
| DE | 101 04 180 | 7/2002 |
| DE | 103 34 000 | 2/2005 |
| DE | 102008040866 | 2/2010 |
| DE | 102008045436 | 3/2010 |
| EP | 2 045 155 | 4/2009 |

* cited by examiner

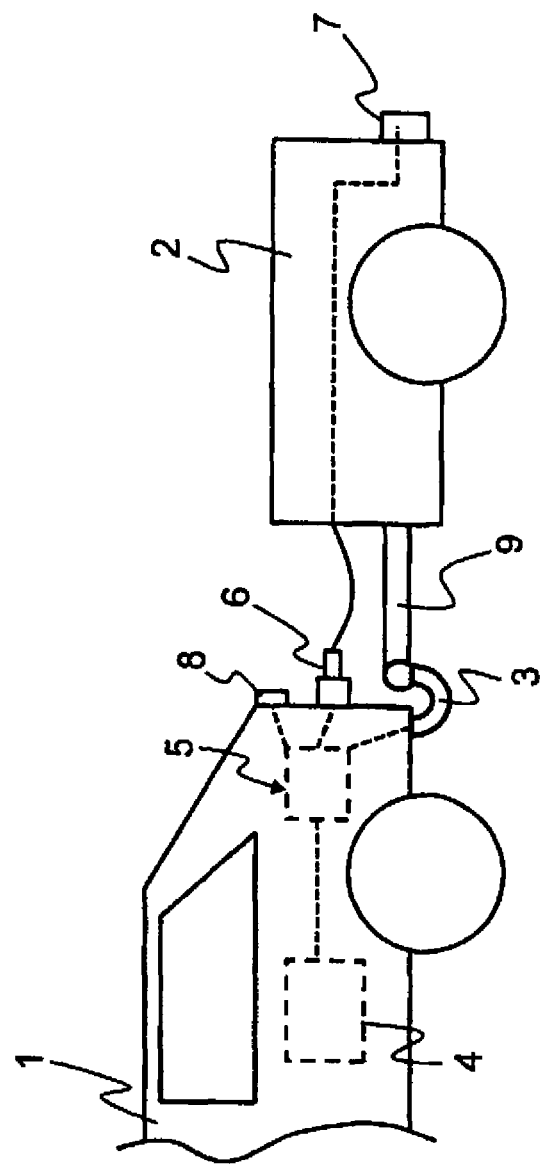

METHOD AND APPARATUS FOR THE RECOGNITION OF A TRAILER OF A MOTOR VEHICLE

CROSS-REFERENCES TO RELATED APPLICATIONS

This application is the U.S. National Stage of International Application No. PCT/EP2011/006073, filed Dec. 5, 2011, which designated the United States and has been published as International Publication No. WO 2012/076138 and which claims the priority of German Patent Application, Serial No. 10 2010 053 818.3, filed Dec. 8, 2010, pursuant to 35 U.S.C. 119(a)-(d).

BACKGROUND OF THE INVENTION

Method and apparatus for the recognition of a trailer or semitrailer of a motor vehicle, wherein the trailer is connectable by a coupling device with the motor vehicle and wherein a control device collects and stores data to the currently connected trailer during an operating phase of the motor vehicle.

Such methods and apparatuses are used in motor vehicle construction to collect and store trailer-related information and to make it available for possible further vehicle subsystems. A trailer or semitrailer can be secured with its drawbar to the coupling device of the vehicle. In particular for driving-dynamics control, data are determined by the control device to be able to better evaluate the handling performance of the currently connected trailer.

DE 100 23 326 A1 describes a method and an apparatus for recognizing a trailer or semitrailer of a motor vehicle, wherein a brake light of the trailer or semitrailer is activated independently of the driver. The current flowing in a line assigned to the brake light of the trailer or semitrailer is measured and the presence or absence of a trailer or semitrailer is measured on the basis of the measured result. Disadvantageous is that the disclosed method is able to distinguish only between a presence or an absence of a trailer or semitrailer. Thus, data ascertained for the trailer or semitrailer for the driving dynamics system during an operating phase of the motor vehicle must be discarded after completion of each operating phase, because there is no assurance that the same trailer or semitrailer is still connected to the motor vehicle.

SUMMARY OF THE INVENTION

It is therefore an object of the present invention to provide a method and an apparatus for the recognition of a trailer of a motor vehicle, that is able to detect a change of the trailer.

This object is achieved by a method for the recognition of a trailer of a motor vehicle, including the following steps of:
collecting and storing data relating to the currently connected trailer during an operating phase of the motor vehicle;
ascertaining a separation of the trailer from the motor vehicle using a characteristic test signal during a shutdown phase of the motor vehicle;
discarding the data when detecting a change of the test signal.

By checking a separation of the trailer (trailer in this context is to be understood to include also semitrailer during the shutdown phase of the motor vehicle by means of a test signal, it can be assessed whether the data collected during the operating phase of the motor vehicle with respect to the currently connected trailer can remain stored or have to be discarded.

When no separation of the trailer from the motor vehicle can be ascertained during the shutdown phase, the data can be continued to be used in a subsequent operating phase, for example, for the purpose of driving-dynamics control or assistance systems. Data considered here involve i.a. the length of a drawbar of the trailer, the buckling angle between motor vehicle and trailer, and a buckling angle offset, and can be "learned" during the operating phase as a result of the evaluation by sensors installed in the motor vehicle. The shutdown phase differs from the operating phase in that the motor vehicle is turned off and not ready for operation. This phase is normally used for a change of the trailer.

In a preferred configuration of the method, the test signal represents an electrical resistance of at least one light bulb of the trailer and/or a drawbar angle of the trailer. The electrical resistance of the light bulbs installed in the trailer has a characteristic value that enables identification of a trailer. In addition or as an alternative, the drawbar angle, i.e. the angle between motor vehicle and trailer, can be monitored when switching between operating phase and shutdown phase. In the event, the drawbar angle has changed during the shutdown phase, it is assumed that a change of the trailer has occurred.

Apparatus for the recognition of a trailer of a motor vehicle, wherein the trailer is connectable by a coupling device to the motor vehicle, wherein a control device collects and stores data during an operating phase of the motor vehicle about the currently connected trailer and wherein means for identification of the trailer during a shutdown phase of the motor vehicle are able to ascertain a separation of the trailer from the motor vehicle by means of a test signal. The coupling device is located at the rear of the motor vehicle, and oftentimes has a ball head for allowing releasable and form-fitting engagement of a drawbar of the trailer. Such a connection allows pivoting of the drawbar about the coupling device, without unintentional detachment from each other. A control device collects data during the operating phase about the currently connected trailer for their use to improve the driving-dynamics control and/or operation of assist systems. The data are retained by the control device until a separation of the trailer from the motor vehicle has been determined by the means for identification of the trailer. For that purpose, the means for identification send during the shutdown phase, a test signal, any change of which is being monitored. The operating phase can preferably be distinguished from the shutdown phase by the state of an ignition device of an internal combustion engine.

In a preferred embodiment, the trailer is connectable by an electrical plug connection to the motor vehicle, wherein the electrical plug connection transmits the test signal. The electrical plug connection provides the power supply for the lighting functions of the trailer.

In a preferred embodiment, the test signal represents an electrical resistance of a light bulb of the trailer and is transmitted at intervals, wherein the separation of the connected trailer from the motor vehicle is detected, when the resistance value is infinitely high. During the shutdown phase, a test signal is sent out at defined intervals to the trailer to represent the electrical resistance of a light bulb. When the resistance is infinitely high at a point in time, it can be concluded that the trailer has been disengaged. Preferably, a diagnosis of the light bulbs is still executed during the operating phase, so that no defective light bulb is monitored. An autonomous microcontroller with low power consumption and short measurement time is especially useful for resistance measurement and is periodically activated by a timer. When detecting a separation of the trailer during the shutdown phase, the collected data of the control device are reset at the beginning of the subsequent operating phase.

In a preferred embodiment, the test signal represents a resistance pattern formed of a plurality of light bulbs of the trailer and determined during the shutdown phase and compared with the determined resistance pattern for the following operating phase, wherein the separation of the connected trailer from the motor vehicle is determined, when the resistance patterns differ. Monitoring the resistances of several light bulbs (brake light, tail light, turn signal) of the trailer results in a resistance pattern that can be precisely assigned to a particular trailer. When the resistance pattern at the end of the operating phase is the same as at the beginning of the following operating phase, it can be assumed that the trailer, about which the control device has collected data, is still connected. In the event, the resistance pattern changes, the collected data of the control device are reset.

In a preferred embodiment, the electrical plug connection has to a solenoid switch, wherein the test signal represents a magnetic field in the solenoid switch, and wherein the separation of the connected trailer from the motor vehicle is determined when the magnetic field changes. Integrated in the electrical plug connection is a magnetic switch which makes a contact, when the electrical plug connection is released and thereby generates a pulse for the means for identification. When a separation of the trailer is detected during the shutdown phase, the collected data of the control device are reset at the beginning of the subsequent operating phase.

In a further preferred embodiment, the electrical plug connection has a mechanism with two internal states of the kind of a flip-flop logic. During the operating phase and with connected trailer, the means of identification activate an "ON" state which is persistent also during the shutdown phase. Separation of the connected trailer from the coupling device during the shutdown and thus also disengagement of the electrical plug connection results in an "OFF" state which persists even after a renewed hitching of any trailer. In the following operating phase, the means for identification are able to recognize based on the state of the flip-flop mechanism, whether the same trailer is still connected to the motor vehicle. The mechanism may operate mechanically, electromagnetically and/or electronically. For example, a snap mechanism can be biased by a relay, or a permanent magnet can be lifted by a relay, which drops upon release of the electrical plug connection. Furthermore, a capacitor may be discharged or an electronic circuit may be activated by an inductive voltage pulse which is generated by a magnet/coil combination when the electrical plug connection is released.

In a preferred embodiment, the means for identification can determine a drawbar angle of the trailer during the shutdown phase and compare it with the drawbar angle for the following operating phase, with the separation of the connected trailer from the motor vehicle being determined when the drawbar angles differ. The drawbar angle is the angle between the motor vehicle and trailer. When the drawbar angle remains the same, it can be assumed that the same trailer is still connected, since it is almost impossible, when changing the trailer, to reproduce the monitored drawbar angle deliberately or accidently.

In a preferred embodiment, the coupling device is configured for measurement of the drawbar angle of the trailer. Coupling devices for measuring the drawbar angle are already known in the art, for example DE 103 34 000 A1.

In a preferred embodiment, an imaging device for the optical determination of the drawbar angle of the trailer tow bar is arranged on the motor vehicle. The imaging device may, for example, involve a rear-view camera arranged at the rear of the motor vehicle. The imaging device can recognize the drawbar of the trailer using suitable image recognition processes and based on this calculate the drawbar angle.

BRIEF DESCRIPTION OF THE DRAWING

Further details and features of the invention will become apparent from the following description of a preferred exemplary embodiment with reference to the drawing.

The FIGURE shows hereby a schematic view of the motor vehicle with connected trailer.

DETAILED DESCRIPTION OF PREFERRED EMBODIMENTS

According to the FIGURE, a motor vehicle 1 has a rear-side coupling device 3 for releasable connection of a trailer 2 via its drawbar 9. The trailer 2 is further connected to the motor vehicle 1 by an electrical plug connection 6 so that the light bulbs 7 at the rear of the trailer 6 can be supplied electrically. The motor vehicle 1 has a control device 4 which can collect data about the currently connected trailer 2 during an operating phase of the motor vehicle 1 and stores it beyond the operating phase. The motor vehicle 1 further includes means for identification 5 of the trailer 2. The means for identification, as shown in the FIGURE, may be used individually or in combination. This includes a coupling device 3, configured for measuring a drawbar angle, an imaging device 8 for the optical determination of the drawbar angle, a magnetic switch in the electrical plug connection 6 and/or the evaluation of an electrical resistance or a resistance pattern of the light bulbs 7 by the means for identification 5. The means for identification 5 check during a shutdown phase of the motor vehicle 1, whether the trailer 2 used during the operating phase 2 remains connected with the motor vehicle 1 up to the following operating phase. When the means for identification 5 recognize a separation of the trailer 2 from the motor vehicle 1, the collected data of the control device 4 are discarded, and the control unit 4 commences again with the collection of data.

The invention claimed is:

1. A method for the recognition of a trailer of a motor vehicle, comprising the steps of:
    collecting, by a processor and storing data relating to a currently connected trailer during an operating phase of the motor vehicle;
    ascertaining a separation of the trailer from the motor vehicle using a characteristic test signal during a shutdown phase of the motor vehicle;
    discarding the data when detecting a change of the test signal.

2. The method of claim 1, wherein the test signal represents at least one of an electrical resistance of at least one light bulb of the trailer and a drawbar angle of the trailer.

3. Apparatus for the recognition of a trailer of a motor vehicle, comprising:
    a coupling device for connecting a trailer to the motor vehicle;
    a control device collecting and storing data about the trailer during an operating phase of the motor vehicle; and
    an identification device, configured to identify the trailer and to ascertain during a shutdown phase of the motor vehicle a separation of the trailer from the motor vehicle on the basis of a test signal.

4. The apparatus of claim 3, further comprising an electrical plug connection for connecting the trailer to the motor vehicle, said electrical plug connection configured to transmit the test signal.

5. The apparatus of claim 4, wherein the test signal represents an electrical resistance of a light bulb of the trailer and is transmitted at intervals, wherein the separation of the trailer from the motor vehicle is detected by the identification device when the resistance is infinitely high.

6. The apparatus of claim 4, wherein the test signal is a resistance pattern formed by a plurality of light bulbs of the trailer and determined during the shutdown phase and compared with a determined resistance pattern of a following operating phase, wherein the separation of the trailer from the motor vehicle is determined by the identification device, when the resistance patterns differ.

7. The apparatus of claim 4, wherein the electrical plug connection has a magnetic switch, said test signal representing a magnetic field in the magnetic switch, wherein the separation of the trailer from the motor vehicle is determined, when the magnetic field changes.

8. The apparatus of claim 3, wherein the identification device is configured to determine a drawbar angle of the trailer during the shutdown phase and to compare the drawbar angle with a drawbar angle of a following operating phase, wherein the separation of the trailer from the motor vehicle is determined, when the drawbar angles differ.

9. The apparatus of claim 8, wherein the coupling device is a part of the identification device and configured for a measurement of the drawbar angle of the trailer.

10. The apparatus of claim 8, wherein the identification device includes an imaging device, arranged on the motor vehicle, for the optical determination of the drawbar angle of the trailer.

11. The apparatus of claim 3, wherein the control device is operably connected to the identification device and configured to discard the data, when the identification device detects the separation of the trailer from the motor vehicle.

* * * * *